United States Patent [19]
Birkett

[11] Patent Number: 5,456,108
[45] Date of Patent: Oct. 10, 1995

[54] BAFFLE ASSEMBLY FOR ULTRASONIC LIQUID LEVEL MEASURING PROBE

[75] Inventor: Robert E. Birkett, Shelburne, Vt.

[73] Assignee: Simmonds Precision Products, Inc., Akron, Ohio

[21] Appl. No.: 153,017

[22] Filed: Nov. 15, 1993

[51] Int. Cl.⁶ ............................. G01F 23/00; G01N 9/00
[52] U.S. Cl. ........................................ 73/290 V; 73/304 C
[58] Field of Search ............................. 73/290 V, 304 C

[56] References Cited

U.S. PATENT DOCUMENTS

| | | | |
|---|---|---|---|
| 3,798,515 | 3/1974 | Di Giacomo | 361/284 |
| 3,864,609 | 2/1975 | Di Giacomo | 361/280 |
| 3,921,451 | 11/1975 | Di Giacomo | 73/304 |
| 4,229,798 | 10/1980 | Rosie | 364/564 |
| 4,361,038 | 11/1982 | Schuler | 73/295 |
| 4,467,646 | 8/1984 | Berryman et al. | 73/304 C |
| 4,677,305 | 6/1987 | Ellinger | 73/290 V X |
| 4,815,323 | 3/1989 | Ellinger et al. | 73/290 V |
| 5,172,594 | 12/1992 | Dyke | 73/290 V |
| 5,243,860 | 9/1993 | Habart | 73/291 |
| 5,309,763 | 5/1994 | Sinclair | 73/290 V |

FOREIGN PATENT DOCUMENTS 2265219  9/1993  United Kingdom.

*Primary Examiner*—William A. Cuchlinski, Jr.
*Assistant Examiner*—Willie Morris Worth
*Attorney, Agent, or Firm*—Carl A. Rankin; William E. Zitelli; Richard A. Romanchik

[57] ABSTRACT

A baffle assembly for use in an ultrasonic system for measuring the level of a contained volume of liquid by calculating the density of the liquid by determining the dielectric constant thereof. The baffle assembly is located at the lower end of a stillwell located within the volume of liquid, The assembly includes a pair of concentric sleeves formed of electrically conductive material located to surround the lower end portion of the stillwell. The sleeves are uniformly radially spaced from one another so as to function as a capacitor so that the electrical capacitance between the respective opposed surfaces of the sleeves may be determined.

5 Claims, 1 Drawing Sheet

BAFFLE ASSEMBLY FOR ULTRASONIC LIQUID LEVEL MEASURING PROBE

BACKGROUND OF THE INVENTION

The invention relates to ultrasonic measuring systems and especially those that utilize an ultrasonic transducer for sending and receiving ultrasonic signals that are directed through a volume of liquid in a container to measure the level of the liquid. More particularly, the invention relates to a probe or stillwell in the form of a tube located in the volume of liquid with its axis generally perpendicular to the surface of the contained liquid.

Ultrasonic measuring systems are commonly used to measure the level of liquid in containers such as fixed storage tanks, fuel storage reservoirs and aircraft fuel tanks. These systems generally use a tubular probe or stillwell inserted approximately vertically in the tank. An ultrasonic transducer transmits a sinusoidal acoustical pulse through the stillwell to the surface of the liquid. Then an echo returns from the surface of the liquid to the transducer and provides a sinusoidal echo signal. A receiver responds to the echo signal and the total elapsed time is determined. Thus, further data is calculated for display.

In these systems, a transducer assembly containing a piezoelectric crystal is usually connected to the stillwell at or near the bottom of the tank. The stillwell generally has openings through its tubular wall near the bottom of the tank to admit liquid from the surrounding volume. The tube is usually open at the top so that the height of the column of liquid in the tube is essentially the same as the height of the contained liquid volume.

In order to assure accurate measurements, it is desirable to provide baffles around the lower end portion of the tube or probe to prevent the entrance of air bubbles into the liquid filled column. The presence of bubbles in the column through which the ultrasonic pulse is directed could adversely effect the resulting measurement.

The bubble baffles typically are constructed of concentric sleeves with offset, interconnecting holes for fluid passage so that the liquid can have access to the interior of the tube. The bubbles are apt to be generated particularly in aircraft fuel tanks due to sudden movements and changes in attitude of the aircraft. Also, bubbles may be generated during refueling.

Some ultrasonic fuel measurement systems may require the determination of the fuel dielectric constant in order to calculate the density of the liquid. It is important to calculate fuel density on a continuous basis due to variations thereof that occur in response to temperature changes, changes in the velocity of sound and in the dielectric constant. Accordingly, these particular systems must utilize an electrical device or sensor to determine the dielectric constant.

Such dielectric sensors are typically constructed of a number of concentric sleeves emersed in the liquid. The sleeves are formed of an electrically conductive material and are adapted to function as the plates of a capacitor. By determining the electrical capacitance between the opposed surfaces of the emersed concentric tubes, the dielectric constant can be calculated.

It will be seen that these requirements, among others, dictate that a rather complex assembly be provided in order to properly utilize the stillwell or probe to obtain the fuel level measurements sought.

The baffle assembly of the present assembly reduces the difficulties described above and affords other features and advantages heretofore not obtainable.

SUMMARY OF THE INVENTION

The present invention is concerned with an ultrasonic system for measuring the level of a contained volume of liquid by calculating the density of the liquid including the determination of the dielectric constant thereof, as well as by calculating the duration of travel of an ultrasonic signal transmitted to the surface of a column of the liquid in a tube or stillwell located within the volume. The axis of the tube is generally perpendicular to the surface of the volume of liquid and the tube is provided with ports at its lower end portion that permit entry of liquid from the surrounding volume.

In accordance with the invention, at least two concentric sleeves formed of electrically conductive material are located within the liquid volume surrounding the lower end portion of the tube. The concentric sleeves are uniformly radially spaced from one another, so that the electrical capacitance between their respective opposed surfaces may be determined. The sleeves are also advantageously located so as to provide a baffle means around the lower end of the tube to reduce the effects of bubbles in the liquid.

DESCRIPTION OF THE PREFERRED EMBODIMENT

Figure 1:
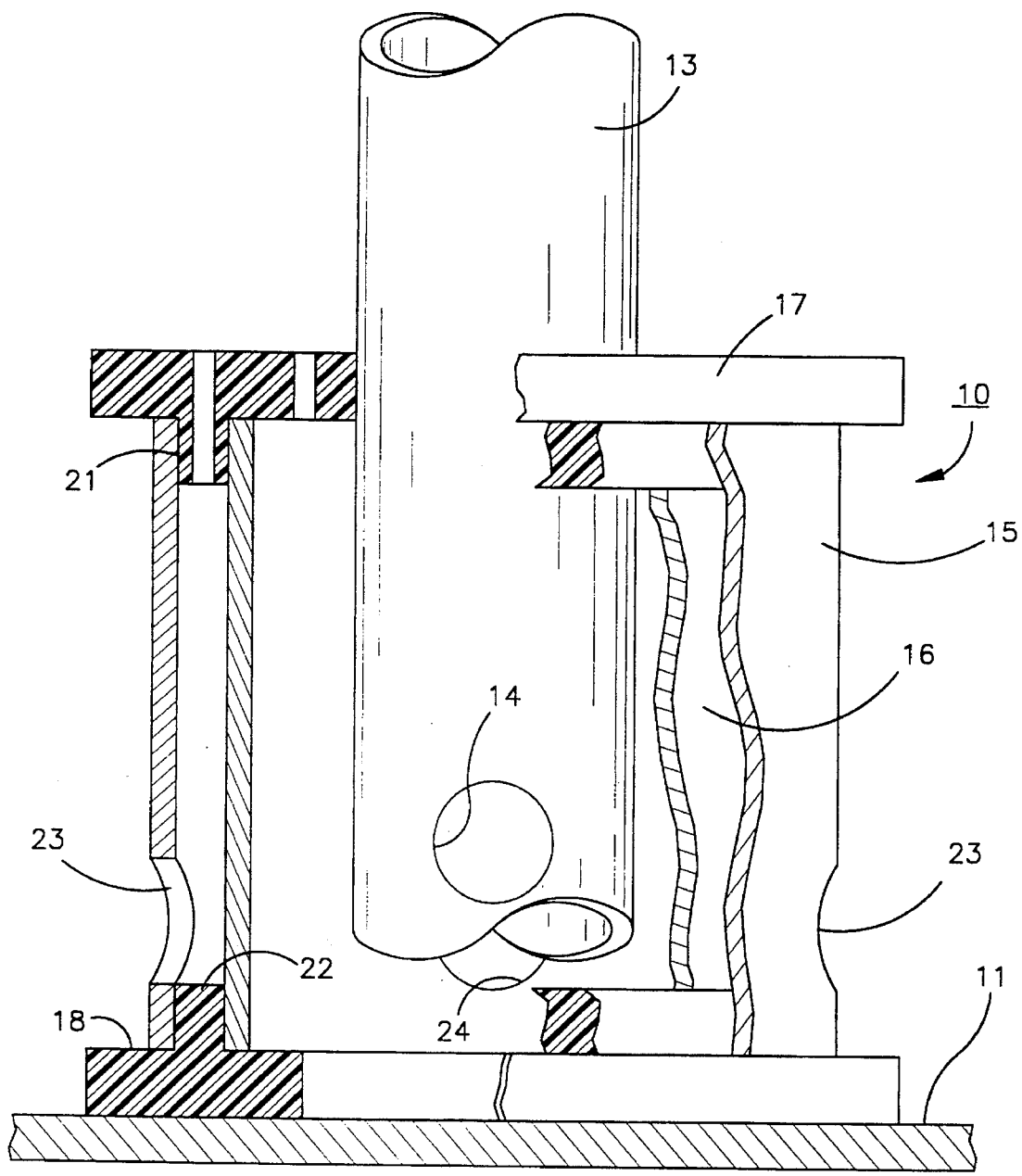
FIG. 1 is an elevational view of a baffle assembly located at the lower end of a stillwell in accordance with the invention, with parts broken away and shown in section for the purpose of illustration.

Referring more particularly to the drawing, there is shown a baffle assembly 10 located on the floor of a fuel tank 11 which in the present embodiment may be considered the floor of an aircraft fuel tank. The fuel level in the tank is to be measured and displayed by means of an ultrasonic fuel level measuring system. The system utilizes an ultrasonic transducer for sending and receiving ultrasonic signals that are directed through the confined volume of fuel in the fuel tank.

A part of this system is a tubular probe or stillwell 13 that is inserted approximately vertically in the tank. The stillwell 13 is provided with one or more radial openings 14 to permit fuel in the contained volume to freely enter. The purpose of the stillwell is to provide a liquid column that represents the level in the entire fuel tank but which is not subject to turbulence and other influences that could adversely effect the measurement.

The ultrasonic transducer that is used in association with the stillwell is not shown, however, the use of such a device is well understood by those skilled in the art.

The purpose of the bubble baffle assembly 10 as indicated above, is to prevent the entrance of gas bubbles into the fluid filled column within the stillwell 13. This reduces the possibility that bubbles in the fuel-filled column could influence the measurements obtained utilizing the ultrasonic pulses which are transmitted through the column.

The baffle assembly 10 in the embodiment illustrated in FIG. 1, includes an outer cylindrical sleeve 15 and an inner cylindrical sleeve 16. In accordance with the invention, the sleeves 15 and 16 are formed of an electrically conductive material and are uniformly radially spaced from one another so that they may function as the plates of a capacitor.

The sleeves 15 and 16 are mounted concentrically around the stillwell 13 by means of an annular upper seal ring 17 and an annular lower seal ring 18. The seal rings 17 and 18, are formed of a dielectric material to provide electrical insulation.

The sleeves are spaced from one another by means of an annular upper spacer rib 21 formed on the downwardly facing surface of the upper seal ring 17 and by an annular lower spacer rib 22 formed integrally with and extending upwardly from the surface of the lower seal ring 18. The upper seal ring engages the surface of the stillwell 13 so that the annular spaces defined within the baffle assembly 10 are closed at the top except for vent openings to allow cumulated bubbles to escape. Fuel in the surrounding volume may enter the interior of the baffle assembly through radial openings 23 formed in the outer sleeve 15 and offset radial openings 24 formed in the inner sleeve 16. This produces a baffle effect that minimizes the possibility that bubbles generated during aerial maneuvers or during refueling will enter the stillwell 13. Additional sleeves may be added to increase the baffling effect or increase the capacitance of the dielectric sensor or both.

As indicated above, the lower end of the stillwell 13 and the transducer are located within the bubble baffle structure in order to achieve the results described above. This arrangement also provides an advantageous means for force distribution to protect tank integrity during a crash.

In accordance with the present invention, the baffle assembly 10, not only serves the baffling function described above but also functions to provide a capacitor that is used to measure the fuel dielectric constant. The measurement is obtained by circuit means connected to the sleeves 15 and 16 in such a way that the sleeves act as the plates of a capacitor that forms part of a dielectric sensor. The measurement thus obtained, is utilized together with other measurements such as the temperature of the fuel and the velocity of sound, to determine the fuel density. This data is then used in conjunction with the measurements obtained by the ultrasonic fuel level measuring system to determine the mass of fuel with a high degree of accuracy.

While the invention has been shown and described with respect to a specific embodiment thereof, this is intended for the purpose of illustration rather than limitation and other variations and modifications of the specific device herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

I claim:

1. In an ultrasonic liquid level measuring system that determines the duration of travel of an ultrasonic pulse transmitted in a contained volume of liquid to be measured, and the dielectric constant of said liquid, the improvement which comprises;

a tube located in and adapted to contain a column of said liquid to be measured, said tube having a lower end portion with means to admit said liquid;

baffle means located in said liquid surrounding said lower end portion of said tube for preventing the entrance of bubbles into said column of said liquid, said baffle means including;

a first sleeve and a second sleeve located within said first sleeve;

said sleeves being formed of electrically conductive material and being radially spaced from one another to form a capacitor used to measure the dielectric constant of said liquid.

2. The improvement of claim 1, wherein said contained volume of liquid defines a free upper surface and said tube is located approximately perpendicular to said surface and wherein said sleeves are concentric with said tube.

3. The improvement of claim 2, wherein said tube has a central axis and wherein said ultrasonic pulse is transmitted along said axis through a column of liquid contained in said tube.

4. The improvement of claim 2, wherein said volume of liquid is contained in an aircraft fuel tank having a floor and said sleeves and said tube are mounted on said floor.

5. The improvement of claim 1, wherein the dielectric constant of said liquid is used to calculate the density of said liquid.

\* \* \* \* \*